US008231083B2

(12) United States Patent
Kutzmann et al.

(10) Patent No.: US 8,231,083 B2
(45) Date of Patent: Jul. 31, 2012

(54) SYSTEM AND METHODS FOR AIRBORNE LAUNCH AND RECOVERY OF AIRCRAFT

(75) Inventors: Aaron J. Kutzmann, Long Beach, CA (US); Kevin R. Lutke, Huntington Beach, CA (US); Zachary C. Hoisington, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 1060 days.

(21) Appl. No.: 12/062,861

(22) Filed: Apr. 4, 2008

(65) Prior Publication Data

US 2010/0276537 A1   Nov. 4, 2010

Related U.S. Application Data

(63) Continuation-in-part of application No. 11/874,804, filed on Oct. 18, 2007, now Pat. No. 7,900,866.

(51) Int. Cl.
*B64D 1/10* (2006.01)
(52) U.S. Cl. .................................................. 244/137.4
(58) Field of Classification Search .............. 244/115, 244/116, 63, 2, 1 TD, 137.1, 110 F, 137.4; 114/251, 261
See application file for complete search history.

(56) References Cited

U.S. PATENT DOCUMENTS

| 1,164,967 A | 12/1915 | Thorp |
| 1,547,912 A | 7/1925 | Hall |
| 1,731,091 A | 10/1929 | Clayton |
| 1,869,506 A | 8/1932 | Richardson |
| 3,167,278 A | 1/1965 | Roberge |
| 3,520,502 A | 7/1970 | Smethers, Jr. |
| 3,599,907 A | 8/1971 | Ramsom et al. |
| 4,645,144 A | 2/1987 | Zupanick |
| 4,890,751 A | 1/1990 | Opdahl |
| 4,923,148 A | 5/1990 | Fillingham et al. |

(Continued)

FOREIGN PATENT DOCUMENTS

GB     2017617     3/1978

OTHER PUBLICATIONS

Search Report from UK Intellectual Property Office on co-pending UK application (GB0814038.6) dated Nov. 27, 2008.

(Continued)

*Primary Examiner* — Galen Barefoot
(74) *Attorney, Agent, or Firm* — Yee & Associates, P.C.

(57) ABSTRACT

A system and methods for airborne launch and recovery of aircraft. In one embodiment the system comprises a flexible tether configured to be towed behind an airborne mother ship. A drag device is secured to a distal end of the flexible tether to generate drag and maintain tension in the flexible tether. A reel associated with the mother ship anchors a proximal portion of the flexible tether and selectively lets out and takes up the flexible tether to adjust a length of the flexible tether. A capture mechanism associated with the aircraft engages the flexible tether to secure the aircraft to the flexible tether. In certain embodiments of the present methods, a flexible tether is deployed from an airborne mother ship. An aircraft translates forward and rearward along the flexible tether. Alternatively, the aircraft translates forward and rearward as the flexible tether taken up and let out from the mother ship. Prior to launch, the weight of the aircraft is transferred from the flexible tether to the wings. During recovery, the weight of the aircraft is transferred from the wings to the flexible tether.

23 Claims, 8 Drawing Sheets

U.S. PATENT DOCUMENTS

| | | | |
|---|---|---|---|
| 4,966,064 | A | 10/1990 | Kaustrater et al. |
| 5,103,712 | A | 4/1992 | Minovitch |
| 6,079,664 | A | 6/2000 | Salzberger |
| 6,606,933 | B2 | 8/2003 | Falk |
| 6,874,729 | B1 | 4/2005 | McDonnell |
| 7,097,137 | B2 | 8/2006 | McDonnell |
| 7,104,499 | B1 | 9/2006 | Arata |
| 7,152,828 | B1 | 12/2006 | Garcia et al. |
| 7,156,036 | B2 | 1/2007 | Seiple |
| 7,188,807 | B2 | 3/2007 | Smith |
| 2005/0145752 | A1 | 7/2005 | Beyerle |
| 2006/0202088 | A1 | 9/2006 | Padan |

OTHER PUBLICATIONS

USPTO office action for U.S. Appl. No. 11/831806 dated Jan. 18, 2011.

Co-pending related US patent application filed Jul. 31, 2007; U.S. Appl. No. 11/831,806; Title: *"Reconfigurable Aircraft and Associated Methods"*.

"CEROS Project Description", CEROS—National Defense Center of Excellence for Research in Ocean Sciences, pp. 1-2, Jun. 26, 2006, http://www.ceros.org/documents/projectdescriptions/13%PD__CTA__SoftRail__53798.pdf.

USPTO office action for U.S. Appl. No. 11/874,804 dated May 26, 2010.

SYSTEM AND METHODS FOR AIRBORNE LAUNCH AND RECOVERY OF AIRCRAFT

CROSS-REFERENCE TO RELATED APPLICATION

This application is a continuation-in-part of application Ser. No. 11/874,804, filed on Oct. 18, 2007, now U.S. Pat. No. 7,900,866, issued Mar. 8, 2011, the entire contents of which are hereby incorporated by reference.

BACKGROUND

1. Technical Field

The present disclosure relates to aircraft.

2. Description of Related Art

In modern warfare tactical aircraft are an indispensable asset to military commanders. However, tactical aircraft are limited by, for example, fuel capacity, weaponry capacity and configuration, and maintenance intervals. In-flight refueling can extend combat operations. However, aircraft must still return to a ground base to rearm and to have maintenance performed. Similarly, aircraft used in civilian applications such as crop-dusting, aerial police/traffic surveillance, and countering man-portable air-defense systems are also limited by their need to return to ground for maintenance, reconfiguration, etc.

These limitations are exacerbated in unmanned air vehicles (UAVs) and unmanned combat air vehicles (UCAVs). For simplicity, the abbreviation UAV will be used herein to refer to both unmanned air vehicles and unmanned combat air vehicles. With the advent of unmanned tactical aircraft, mission endurances have increased steeply due to the elimination of pilot fatigue as a limiting factor. This steep increase in endurance is particularly acute for intelligence, surveillance, and reconnaissance (ISR) missions and hunter-killer missions. But tactical UAVs configured for high endurance typically achieve endurance at the expense of speed and range, thus limiting the spectrum of situations in which they can be deployed. The limited range of some UAVs can be overcome by launching them from airborne transport vehicles.

The ability to recover and re-launch aircraft using an airborne mother ship would enable the aircraft to operate virtually indefinitely. Upon recovery, the aircraft could be refueled, rearmed and serviced aboard the mother ship, after which it could be re-launched to return to the battle theatre. In the case of manned aircraft, pilot changes could also be performed while the aircraft is docked with the mother ship. Historically, however, attempts at airborne recovery of aircraft have met with little, if any, success.

Attempts at airborne recovery include the FICON (Fighter Conveyor) experiments, in which the daughter aircraft had a hook on its upper surface that caught a trapeze hanging from the mother ship, the Akron and Macon (U.S. airships that carried fighters and captured them with a trapeze system), the Tom-Tom experiments, the Tupolev Zveno and the Firebee II drone, which deployed a parachute that could be snagged by a trapeze device hanging from a passing helicopter. Thus far, trapeze-based solutions are the only ones that have worked to bring the aircraft inside the mother ship. However, even these moderate successes failed to solve the major problems associated with traditional trapeze- or arm-based airborne recovery, in which the recovered aircraft's weight must be transitioned from its own lift to the mother ship. The transition typically happens close to the mother ship, due to the length of the recovery device, requiring the difficult connection to be made as the deployed aircraft transitions from "clean" air, to a turbulent wake and boundary layer surrounding the mother ship and finally to dead air where it cannot create sufficient lift for flight. These transitions through different types of air make it very difficult to control the aircraft being recovered.

SUMMARY

The embodiments of the present system and methods for airborne launch and recovery of aircraft have several features, no single one of which is solely responsible for their desirable attributes. Without limiting the scope of the present embodiments as expressed by the claims that follow, their more prominent features will now be discussed briefly. After considering this discussion, and particularly after reading the section entitled "Detailed Description," one will understand how the features of the present embodiments provide advantages, which include the ability to recover and re-launch aircraft so that their missions can be extended indefinitely, and the ability to recover and launch aircraft smoothly without being significantly affected by turbulent airflow near the mother ship.

One aspect of the present embodiments includes the realization that would be advantageous to be able to launch and recapture aircraft, such as UCAVs, from an airborne mother ship. The ability to recapture the aircraft would advantageously enable refueling, re-supplying, rearming and/or reconfiguration of the aircraft in flight, during the course of a mission. Such capabilities would enable the mission of each such aircraft to be extended indefinitely.

One embodiment of the present system for airborne launch and recovery of aircraft comprises a flexible tether configured to be towed behind an airborne mother ship, and a drag device secured to a distal end of the flexible tether. The drag device is configured to generate drag and maintain tension in the flexible tether. The system further comprises a reel associated with the mother ship. The reel is configured to anchor a proximal portion of the flexible tether and to selectively let out and take up the flexible tether. The system further comprises a capture mechanism associated with the aircraft. The capture mechanism is configured to engage the flexible tether to secure the aircraft to the flexible tether.

One embodiment of the present methods for airborne launch of aircraft comprises the steps of deploying a flexible tether from an airborne mother ship, translating an aircraft, including wings, rearward away from the mother ship, and transferring the weight of the aircraft from the flexible tether to the wings.

One embodiment of the present methods for airborne recovery of aircraft comprises the steps of deploying a flexible tether from an airborne mother ship, the aircraft engaging the flexible tether, transferring the weight of the aircraft from the wings to the flexible tether, and translating the aircraft forward toward the mother ship.

Another embodiment of the present system for airborne launch and recovery of aircraft comprises a capture mechanism associated with the aircraft and configured to engage a flexible tether during airborne launch and recovery. The capture mechanism comprises a guide member extending from the aircraft, and a latch located at a base of the capture mechanism. The guide member is configured to guide the flexible tether toward the latch during recovery of the aircraft and the latch is configured to engage the flexible tether to secure the aircraft to the flexible tether.

Another embodiment of the present methods for airborne recovery of aircraft comprises the step of guiding the flexible tether into a capture mechanism associated with the aircraft. The capture mechanism includes a latch located at a base thereof. The method further comprises the step of engaging the latch with the flexible tether.

Another embodiment of the present system for airborne launch and recovery of aircraft comprises a reel apparatus associated with a mother ship. The reel apparatus comprises a reel configured to take up and let out a flexible tether that the aircraft is configured to engage during launch and recovery. The reel apparatus further comprises a frame including a plurality of rigid members and configured to support the reel.

The features, functions, and advantages of the present embodiments can be achieved independently in various embodiments, or may be combined in yet other embodiments.

BRIEF DESCRIPTION OF THE DRAWINGS

The embodiments of the present system and methods for airborne launch and recovery of aircraft will now be discussed in detail with an emphasis on highlighting the advantageous features. These embodiments depict the novel and non-obvious system and methods shown in the accompanying drawings, which are for illustrative purposes only. These drawings include the following figures, in which like numerals indicate like parts.

DETAILED DESCRIPTION

Figure 1:
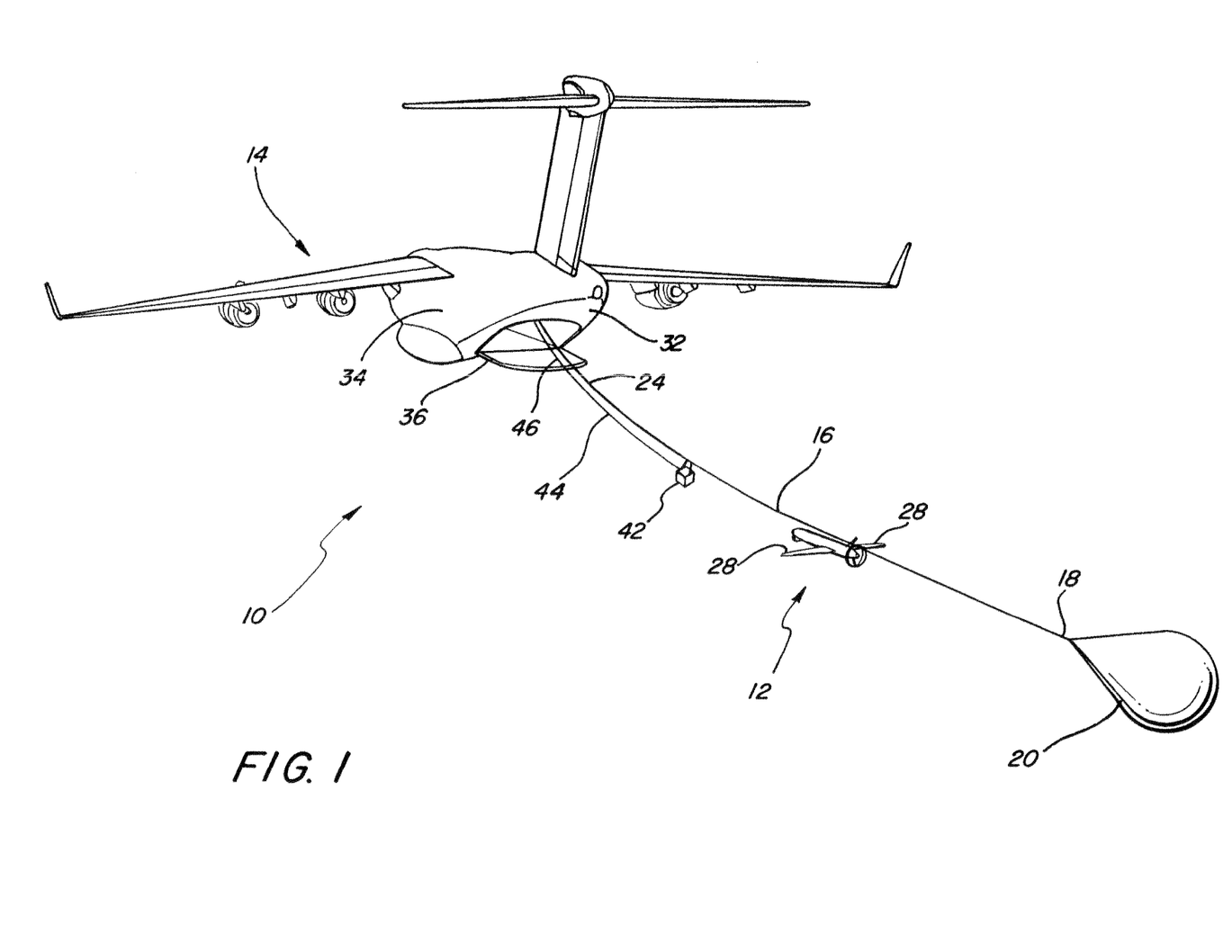
FIG. 1 is a rear perspective view of one embodiment of the present system and methods for airborne launch and recovery of aircraft.

FIG. 1 illustrates one embodiment of the present system 10 for airborne launch and recovery of an aircraft 12. In the present system 10 an airborne mother ship 14 tows a flexible tether 16. A distal end 18 (spaced from the mother ship 14) of the flexible tether 16 includes a drag device 20. The drag device 20 generates drag to maintain tension in the flexible tether 16. The present system 10 further comprises a reel 22 associated with the mother ship 14. The reel 22, which is discussed in further detail below, anchors a proximal portion 24 (near the mother ship 14) of the flexible tether 16 and stows the flexible tether 16. The reel 22 is also configured to selectively let out (deploy) the flexible tether 16 and take up the flexible tether 16. The present system 10 further comprises a capture mechanism 26 (FIGS. 2 and 3) associated with the aircraft 12. The capture mechanism 26 is configured to engage the flexible tether 16 to enable the aircraft 12 to translate along the flexible tether 16. In an alternative embodiment, the capture mechanism 26 may firmly grip the flexible tether 16. The aircraft 12 would then translate toward and away from the mother ship 14 as the flexible tether 16 is let out and taken up by the reel 22.

Figure 2:
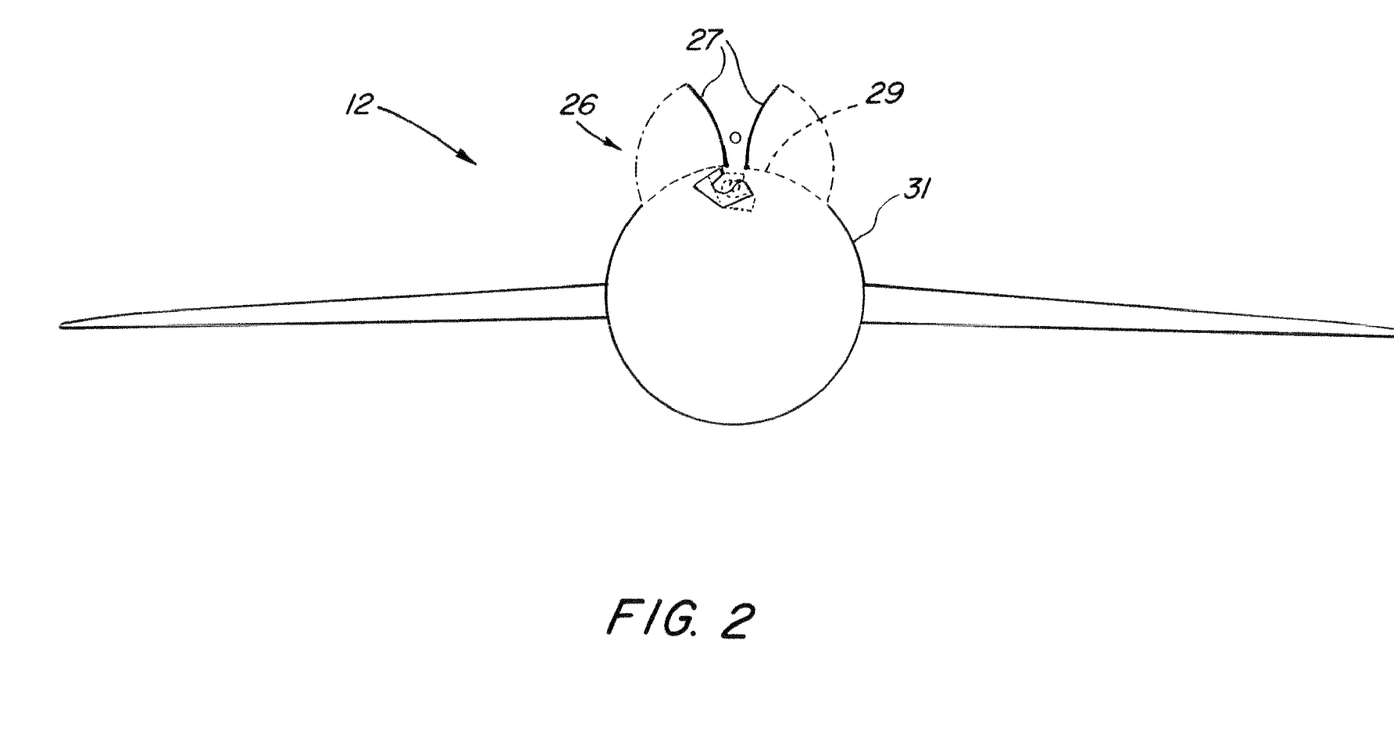
FIG. 2 is a front elevation view of one embodiment of a capture mechanism of the present system and methods for airborne launch and recovery of aircraft.
Figure 3:
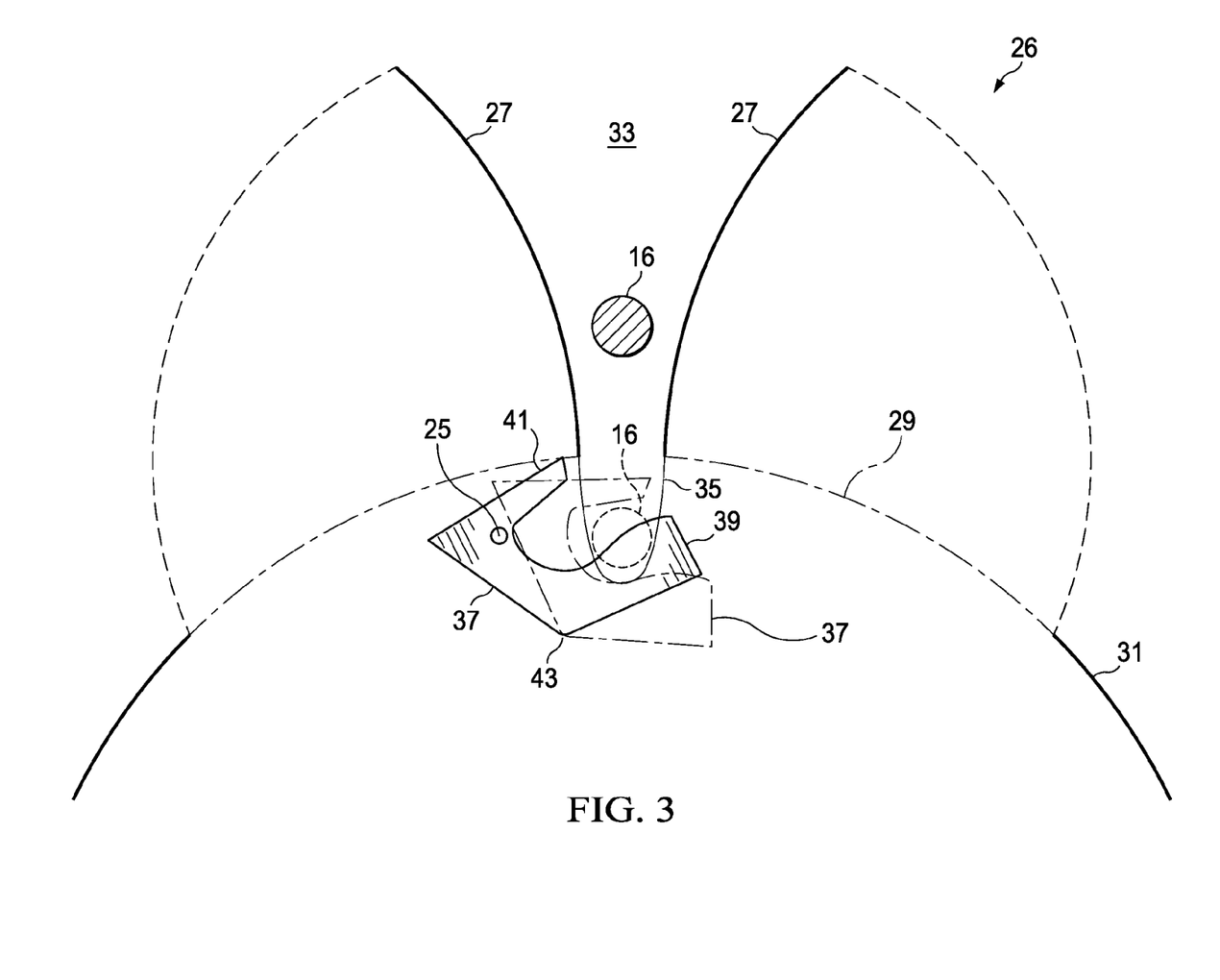
FIG. 3 is a detail front elevation view of the capture mechanism of FIG. 2.

With reference to FIGS. 2 and 3, the capture mechanism 26 comprises first and second guide members 27 extending generally upward from a dorsal surface 29 of the aircraft 12. In one embodiment, the guide members 27 may comprise rotatable portions of the aircraft's fuselage 31. With reference to FIG. 3, the guide members 27 are rotatable between a first position, shown in dashed lines, in which they lie against or are integrated into the aircraft's fuselage 31, and a second position, shown in solid lines, in which they extend upward. The guide members 27 are curved to match the contours of the fuselage 31 when in the first position and to present an inward tapering capture space 33 with which to capture the flexible tether 16. The aircraft 12 may include a single capture mechanism 26, which may be located over the aircraft's center of gravity, or the aircraft 12 may include fore and aft capture mechanisms 26. In certain embodiments the capture mechanism 26 may include only a single guide member 27.

With continued reference to FIG. 3, at a base 35 of the capture mechanism 26 between the guide members 27 a rotatable latch 37 secures the flexible tether 16. The latch 37 is generally L-shaped, including a first depending portion 39 and a second depending portion 41. The latch is 37 pivotable about a base portion 43 between a receiving position, shown in solid lines, and a latched position, shown in dashed lines. When in the receiving position, the latch 37 is configured to receive the flexible tether 16. As the flexible tether 16 enters the base 35 of the capture mechanism 26 it contacts the first depending portion 39. As the flexible tether 16 moves farther into the base 35 it applies force to the first depending portion 39, causing the latch 37 to rotate into the latched position, trapping the flexible tether 16, and securing the aircraft 12 to the flexible tether 16. The latch 37 may include a locking mechanism (not shown) to prevent undesired disengagement of the aircraft 12 from the flexible tether 16. Rather than force applied by the flexible tether 16 causing the latch 37 to rotate, the capture mechanism 26 may include one or more sensors and/or guidance apparatus 25 that detects the presence of the flexible tether 16 and automatically moves the latch 37 from the receiving position to the latched position.

Figure 4:
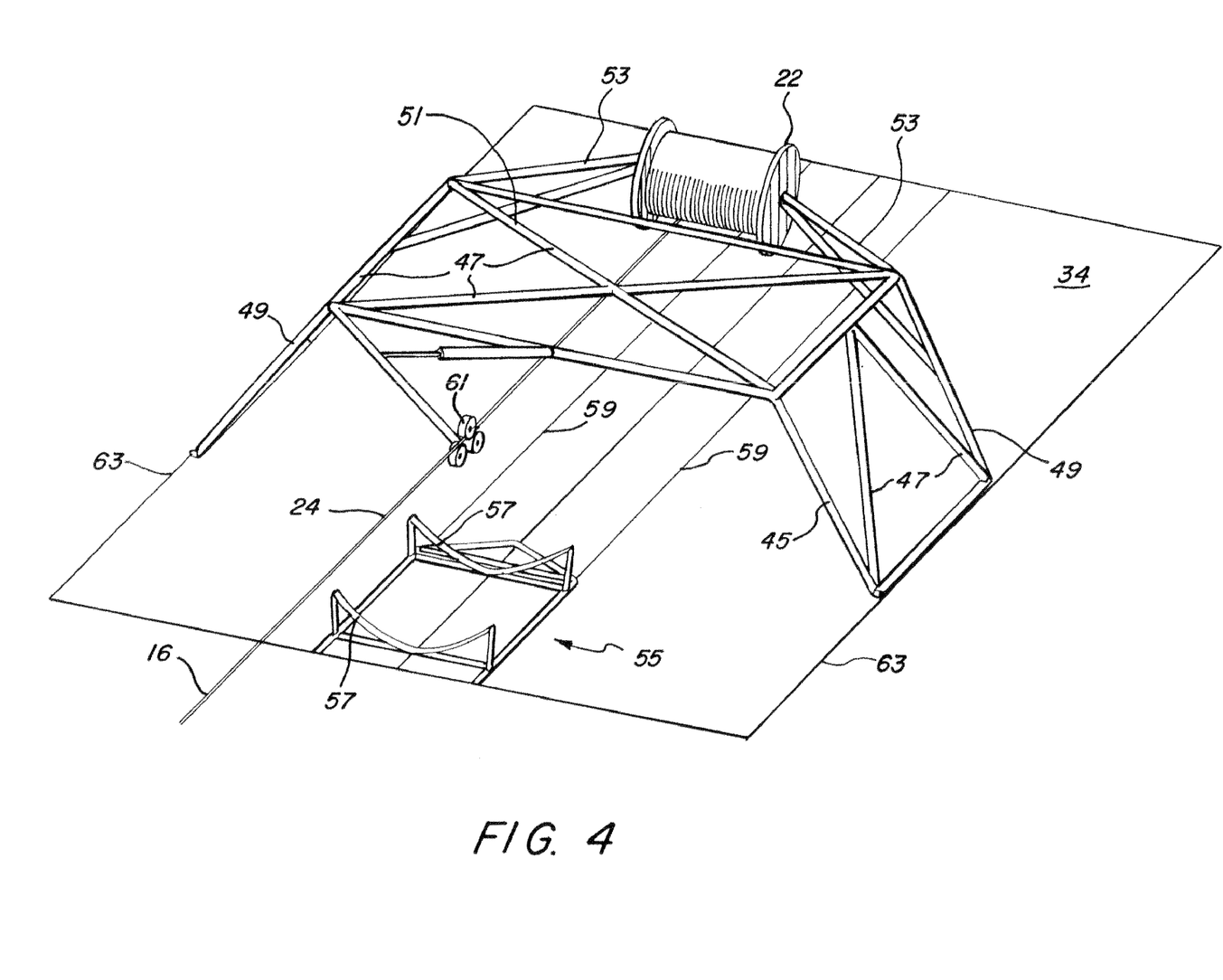
FIG. 4 is a rear perspective view of one embodiment of a reel apparatus of the present system and methods for airborne launch and recovery of aircraft.

With reference to FIG. 4, in the illustrated embodiment the reel 22 is secured to a frame 45 in the cargo hold 34 of the mother ship 14. In certain embodiments the frame 45 may be located on a cargo ramp 36 (FIG. 1) of the mother ship 14. The frame 45 comprises a plurality of rigid members 47 secured to one another to form several rigid truss structures, including first and second side trusses 49 supporting a top truss 51. The rigid members 47 may be constructed of a variety of materials such as metals or composites. The side trusses 49 may lock into existing pallet rails 63 aboard the mother ship 14.

First and second reel-supporting trusses 53 extend forward from the side trusses 49. The reel 22 is advantageously mounted forward of and at about the same height as or slightly below the top truss 51. The flexible tether 16 thus extends from the reel 22 and beneath the top truss 51 so that as the aircraft 12 is brought into the mother ship 14 it can safely enter the space surrounded by the frame 45 without hitting the frame 45. Rollers 61 may be provided to guide the flexible tether 16 as it is unwound from and wound onto the reel 22. The rollers 61 may also assist in leveling the flexible tether 16 and the aircraft 12 during the launch and recovery processes.

As illustrated in FIG. 4, a cradle 55 may be provided to support the aircraft 12 both before it is secured to the flexible tether 16 before launch and after it has been detached from the flexible tether 16 subsequent to recovery. The cradle 55 may comprise first and second substantially U-shaped members 57 configured to support the rounded belly of the aircraft 12. The cradle 55 may be configured to move forward and backward along rails 59 within the cargo hold 34 to move the aircraft 12 back and forth between a storage location within the mother ship 14 and a launch/recovery position. The rails 59 may comprise existing Air Delivery System (ADS) rails such as those that are currently present on many cargo lifters.

The mother ship 14 and/or the aircraft 12 may include one or more sensors and/or guidance apparatus 25 to assist the aircraft 12 in locating the mother ship 14 during the recovery process. For example, the sensors and/or guidance apparatus may include global positioning receivers (GPS), radio frequency (RF) apparatus, satellite guidance apparatus, visual guidance, etc. Further details of the present recovery methods are described below.

The mother ship 14 contains components used in the refueling, rearming and servicing of the aircraft 12. For example, the mother ship 14 may contain fuel, armaments, spare parts, extra pilots, etc. For extended missions, the mother ship 14 may include sleeping quarters for pilots and other personnel. For example, some of the personnel aboard the mother ship 14 may perform refueling, rearming and/or servicing of the aircraft 12. In other embodiments the mother ship 14 may include an autonomous refueling/rearming/servicing system, and could even be completely unmanned.

In certain embodiments the mother ship 14 may be a converted cargo airlifter, such as the Boeing C-17 shown in FIG. 1. However, in certain other embodiments the mother ship 14 may be specifically designed and built for the purpose of airborne launch and recovery. Similarly, the aircraft 12 may comprise an existing aircraft that is modified to be compatible with the present system 10 for airborne launch and recovery, or it may be an aircraft specially designed and built for this purpose. While in the illustrated embodiment the aircraft 12 is an unmanned air vehicle (UAV), those of ordinary skill in the art will appreciate that the present system 10 is also configured for airborne launch and recovery of manned air vehicles.

In embodiments where the mother ship 14 is a converted cargo airlifter, certain embodiments of the present system 10 may provide a self-contained and loadable pallet containing all of the hardware needed to perform airborne launch and recovery. The pallet may be configured to engage existing pallet rails and locking mechanisms on the floor of the airlifter.

The aircraft 12 is advantageously capable of assuming a zero-lift or near zero-lift configuration. For example, the aircraft's wings 28 may include spoilers (not shown) or other apparatus configured to change the profile or plan area of the wings 28 in order to decrease the lift that they provide. In other example embodiments the wings 28 may be capable of morphing, and/or they may be foldable or stowable. In embodiments having foldable or stowable wings 28 the aircraft 12 may advantageously have a very wide wingspan for flight, and then fold or stow its wings 28 in order to fit within the mother ship 14. In certain embodiments the wings 28 may also be jettisonable. In embodiments in which the wings 28 may be jettisoned, they may also be constructed of materials having low density, such as foam, so that they drift slowly to Earth and land without causing damage.

In the zero-lift or near zero-lift configuration, the aircraft 12 is configured to be supported by the tension in the flexible tether 16. Thus, as explained in further detail below, during launch and recovery the aircraft 12 may embody the zero-lift or near zero-lift configuration. As it translates toward the mother ship 14 during recovery it transitions from "clean" air, to a turbulent wake and boundary layer surrounding the mother ship 14 and finally to dead air within the mother ship 14. As it translates away from the mother ship 14 during launch it transitions through these areas in reverse order. These transitions would significantly affect the aircraft's motion if it were not in the zero-lift or near zero-lift configuration. This configuration enables the aircraft 12 to smoothly pass through the transitions without wildly pitching up and down due to rapidly changing lift forces acting on the wings 28. This configuration also reduces roll and/or yaw movements of the aircraft 12 caused by rapidly changing differential lift forces acting on the wings 28.

The flexible tether 16 may be constructed of any material having suitable strength, weight and flexibility characteristics. For example, the flexible tether 16 could be KEVLAR®, one or more metals, such as steel, alloys and/or polymers, such as nylon. The material may also comprise woven fibers. The flexibility of the flexible tether 16 advantageously reduces the forces to which the mother ship 14 and the aircraft 12 are subjected as compared to prior art systems including a rigid arm extending from the mother ship. In such prior art systems, forces acting on either the mother ship or the aircraft are transferred through the rigid arm to the structure at the other end. The longer the arm is, the greater the moments created at the points where the arm connects to the mother ship and to the aircraft. With the present flexible tether 16, forces acting on either the mother ship 14 or the aircraft 12 are absorbed in the flexible tether 16 as it flexes.

The flexible tether 16 can also advantageously be extended farther behind the mother ship 14 as compared to a rigid arm. The comparatively larger and heavier rigid arm is more limited in its length, due to concerns about storage space and weight aboard the mother ship 14. The relatively more compact and light flexible tether 16 can be rolled up into a compact size for storage, and unreeled to greater lengths than a rigid arm. The longer flexible tether 16 enables the aircraft 12 to engage at a point far removed from the mother ship 14 where airflow is less turbulent. The longer flexible tether 16 also enables more than one aircraft 12 to engage the flexible tether 16 at once. Further, the drag device 20 at the distal end 18 of the flexible tether 16 creates tension in the flexible tether 16 that enables the aircraft 12 to be held steady when it is engaged with the flexible tether 16 and as it translates along the flexible tether 16 (for embodiments in which the aircraft 12 translates along the flexible tether 16 rather than being fixed at one point on the flexible tether 16).

The flexible tether 16 may also include one or more sensors and/or guidance apparatus 25 to assist the aircraft 12 in locating and capturing the flexible tether 16 during recovery. The sensors and/or guidance apparatus may comprise, for example, optical sensors and apparatus, such as visible, infrared and/or ultraviolet lights, etc. Alternatively, or in addition, the aircraft 12 may include light detection and ranging (LIDAR) apparatus. Further details of the present recovery methods are described below.

In the illustrated embodiment, the drag device 20 comprises a ballute. However, in other embodiments the drag device 20 may comprise, for example, a parachute or any other device configured to create drag at the distal end 18 of the flexible tether 16. The drag device 20 may be constructed of, for example, a synthetic material such as nylon or an aramid such as KEVLAR®. In certain embodiments, characteristics of the drag device 20 may be changed while the drag device 20 is deployed at the end of the flexible tether 16. For example, the drag device 20 may be deflated or otherwise rendered ineffective so that the flexible tether 16 can more easily be reeled into the mother ship 14. Also, the amount of drag created by the drag device 20 may be adjusted upward or downward in order to adjust an amount of tension in the flexible tether 16.

In the illustrated embodiment, the reel 22 is configured to take up and let out the flexible tether 16 by, for example, winding and unwinding the flexible tether 16 from a rotatable member 30. However, those of ordinary skill in the art will appreciate that alternate apparatus may be used to take up and let out the flexible tether 16. In the illustrated embodiment, the reel 22 is located in an aft portion 32 of a cargo hold 34 in the mother ship 14. In certain embodiments the reel 22 may be located on a cargo ramp 36 at the aft 32 of the mother ship 14. However, those of ordinary skill in the art will appreciate that the reel 22 could be located elsewhere.

With continued reference to FIG. 1, in the present system 10 the aircraft 12 includes a capture mechanism 26 configured to engage the flexible tether 16. In the illustrated embodiment, the capture mechanism 26 comprises a latching hook 38 located on a dorsal portion 40 of the aircraft 12. The hook 38 may be configured to extend and retract so that it can reach out to the flexible tether 16 and draw the flexible tether 16 toward the aircraft 12 once it has been captured. Those of ordinary skill in the art will appreciate that the capture mechanism 26 may not be a hook 38, but may have some other shape and/or configuration. Those of ordinary skill in the art will appreciate that the capture mechanism 26 need not be located on the dorsal portion 40 of the aircraft 12, but may be located elsewhere, such as on the port or starboard sides. The capture mechanism 26 and/or the aircraft 12 may also include one or more sensors or guidance apparatus 25 to assist the aircraft 12 in locating and capturing the flexible tether 16, as discussed in further detail below.

While the tension in the flexible tether 16 supports the aircraft 12 when it is in the zero-lift or near zero-lift configuration, the flexible tether 16 does not overcome the drag forces acting on the aircraft 12. Thus, in certain embodiments the present system 10 may also comprise a shuttle 42 configured to translate along the flexible tether 16. The shuttle 42 may selectively engage the aircraft 12 to control movement of the aircraft 12 along the flexible tether 16. The aircraft 12 may include apparatus (not shown) for engaging and temporarily securing the shuttle 42 and the aircraft 12 to one another. The shuttle 42 may be configured to move along the flexible tether 16 under its own power. For example, the shuttle 42 may include motorized friction wheels (not shown) that engage the flexible tether 16 to allow the shuttle 42 to propel itself. Alternatively, or in addition, the shuttle 42 may be connected to a shuttle line 44 that controls its movement. For example, a proximal portion 46 of the shuttle line 44 may be anchored about a second reel associated with the mother ship 14. As the second reel draws in the shuttle line 44 it pulls the shuttle 42 toward the mother ship 14. In certain alternative embodiments apparatus for controlling movement of the aircraft 12 along the flexible tether 16 could be integrated into the aircraft 12, negating the need for the shuttle 42.

Figure 5:
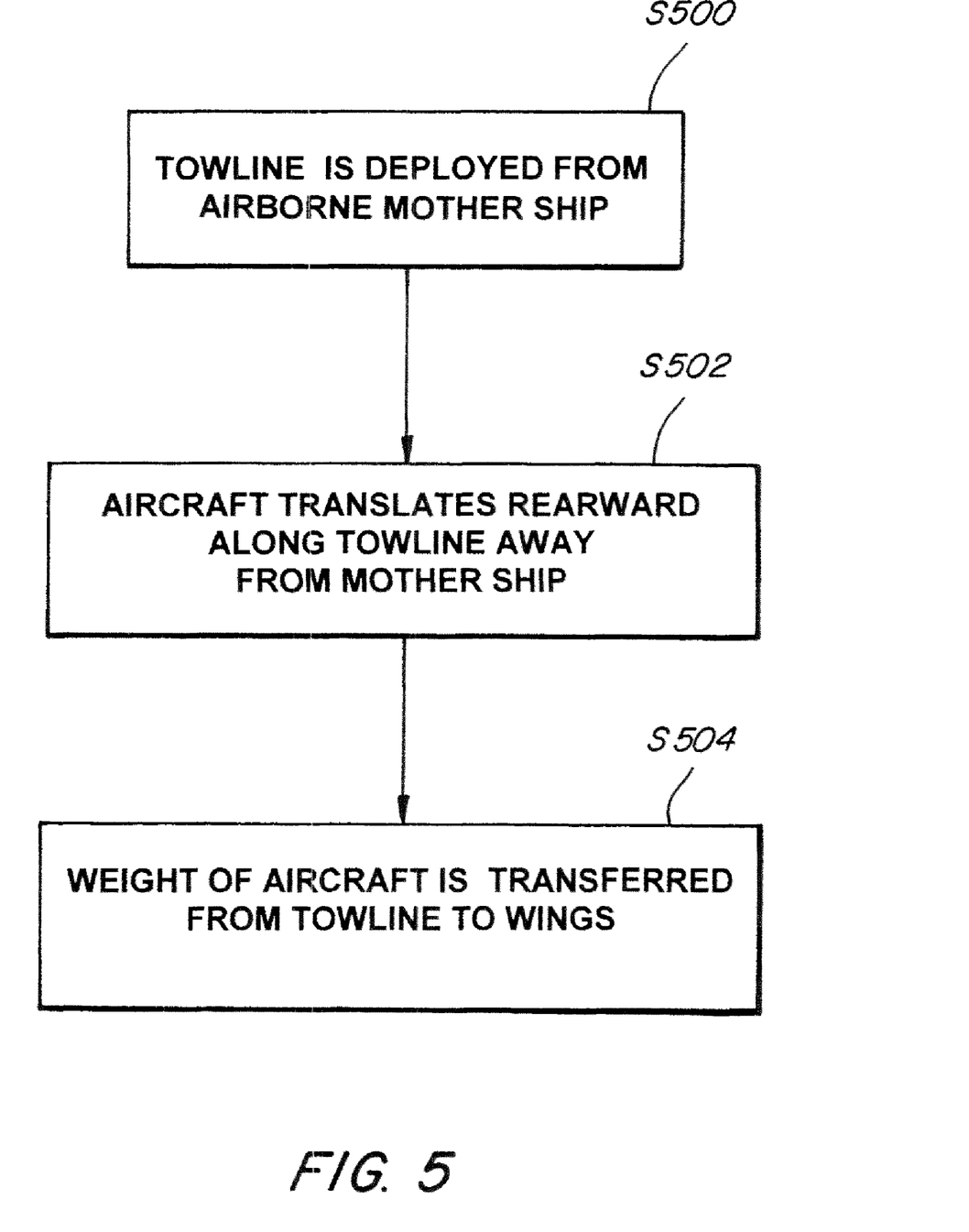
FIG. 5 is a flowchart illustrating one embodiment of the present methods for airborne launch of aircraft.
Figure 5A:
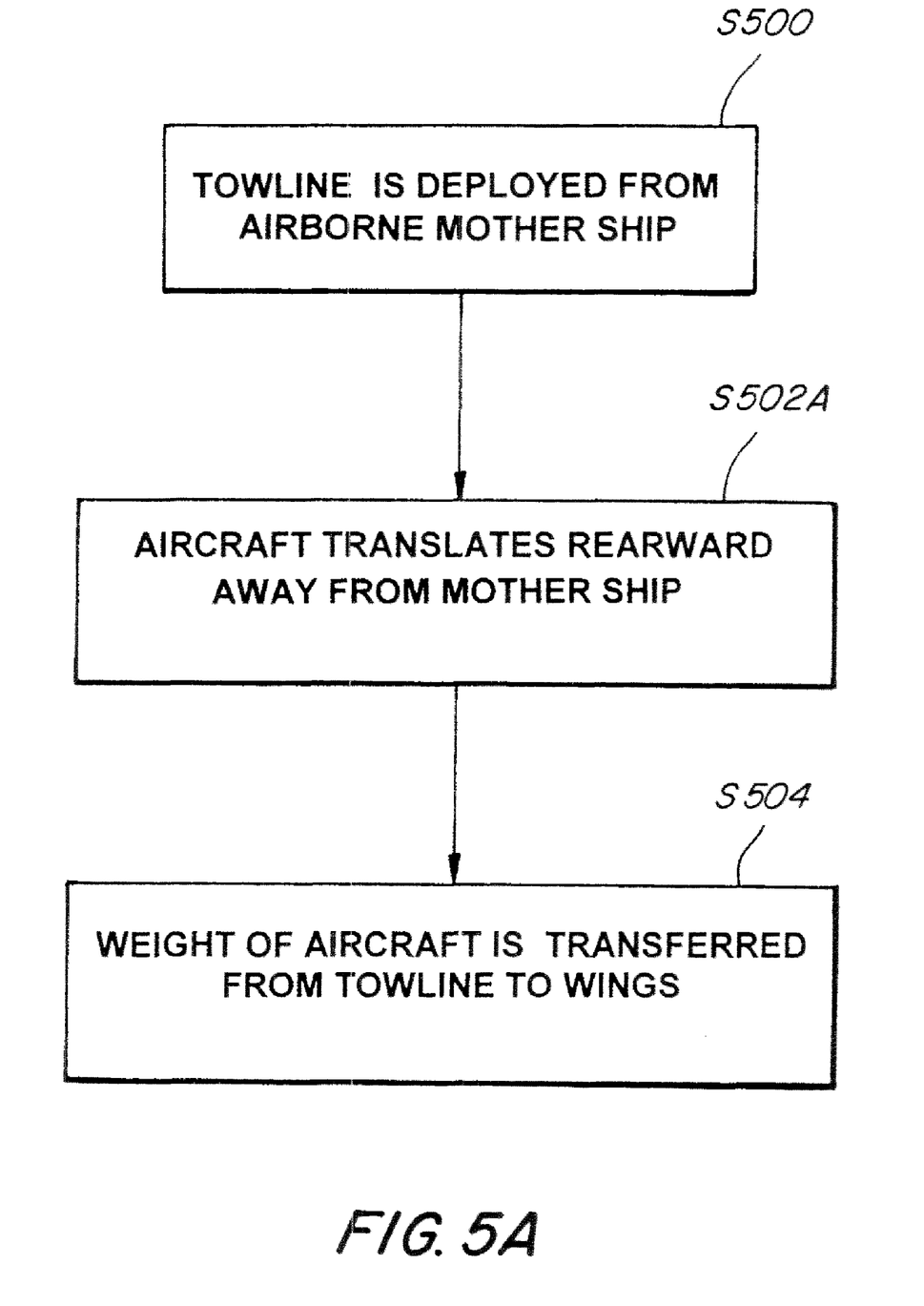
FIG. 5A is a flowchart illustrating another embodiment of the present methods for airborne launch of aircraft.

With reference to FIGS. 5 and 5A, in certain embodiments of the present methods for airborne launch of the aircraft 12, the flexible tether 16 is deployed from the airborne mother ship 14, as shown at step S500. The drag device 20 may first be deployed/inflated so that the drag it creates draws the flexible tether 16 off of the reel 22. Alternatively, the flexible tether 16 may be let out and the drag device 20 deployed/inflated at a point distant from the mother ship 14. A launch device (not shown) may assist in the process of deploying the drag device 20. When the flexible tether 16 is deployed, the aircraft 12 is translated rearward along the flexible tether 16 away from the mother ship 14, as shown at step S502. Alternatively, in embodiments where the position of the aircraft 12 on the flexible tether 16 is fixed, the aircraft 12 is translated rearward away from the mother ship 14 as the flexible tether 16 is unreeled, as shown at step S502A (FIG. 5A). The weight of the aircraft 12 is transferred from the flexible tether 16 to the wings 28, as shown at step S504. In some embodiments the weight of the aircraft 12 may be transferred from the flexible tether 16 to the wings 28 as the aircraft 12 translates rearward away from the mother ship 14. In other embodiments the weight of the aircraft 12 may be transferred from the flexible tether 16 to the wings 28 after the aircraft 12 has reached a desired launch point and further movement of the aircraft 12 has been halted. In certain embodiments a system check may be performed on the aircraft 12 before or after its weight is transferred from the flexible tether 16 to the wings 28. If a problem is discovered during the system check, the launch may be aborted and the aircraft 12 recovered. If, however, all systems are go, the aircraft 12 may be released from the flexible tether 16 and it may proceed to fly under its own power and begin its mission.

Certain embodiments of the present methods for airborne launch of the aircraft 12 may include additional steps. For example, prior to any of the steps outlined above the mother ship 14 may transport the aircraft 12 to an area of operations, such as a battlefield. Sometime prior to launch the aircraft 12 may be moved from a storage rack (not shown) inside the mother ship 14 to a launch position. The aircraft 12 may be secured to the flexible tether 16, perhaps along with the shuttle 42 (FIG. 1), and then pushed out of the cargo hold or off of a launch ramp (which may be the cargo ramp 36). As the aircraft 12 translates rearward away from the mother ship 14, it may be pulled away from the mother ship 14 by its own drag and by the lower dynamic pressure in the freestream. Once the aircraft 12 reaches the desired launch position, its movement may be arrested. For example, the shuttle 42 and the shuttle line 44 may halt further movement of the aircraft 12. Prior to the aircraft's release, its wings 28 may be deployed if they had been folded or stowed. After the aircraft's release, the shuttle 42 may be recovered. For example, the shuttle line 44 may be drawn hack into the mother ship 14, pulling the shuttle 42 along with it. After all aircraft 12 have been launched and/or recovered, the flexible tether 16 may be retracted into the mother ship 14. Before, after or during retraction of the flexible tether 16, the drag device 20 may be deflated or otherwise rendered ineffective.

Figure 6:
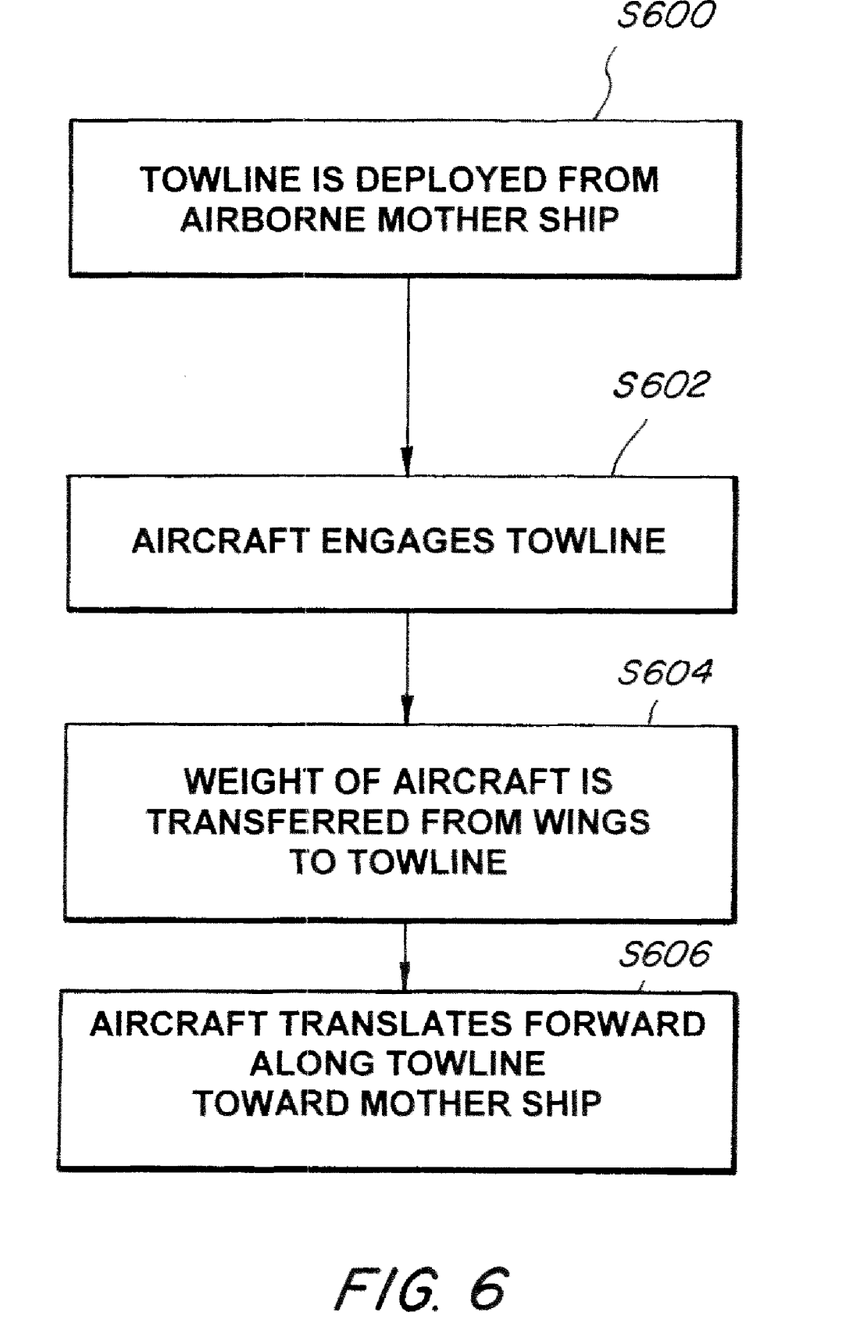
FIG. 6 is a flowchart illustrating one embodiment of the present methods for airborne recovery of aircraft.
Figure 6A:
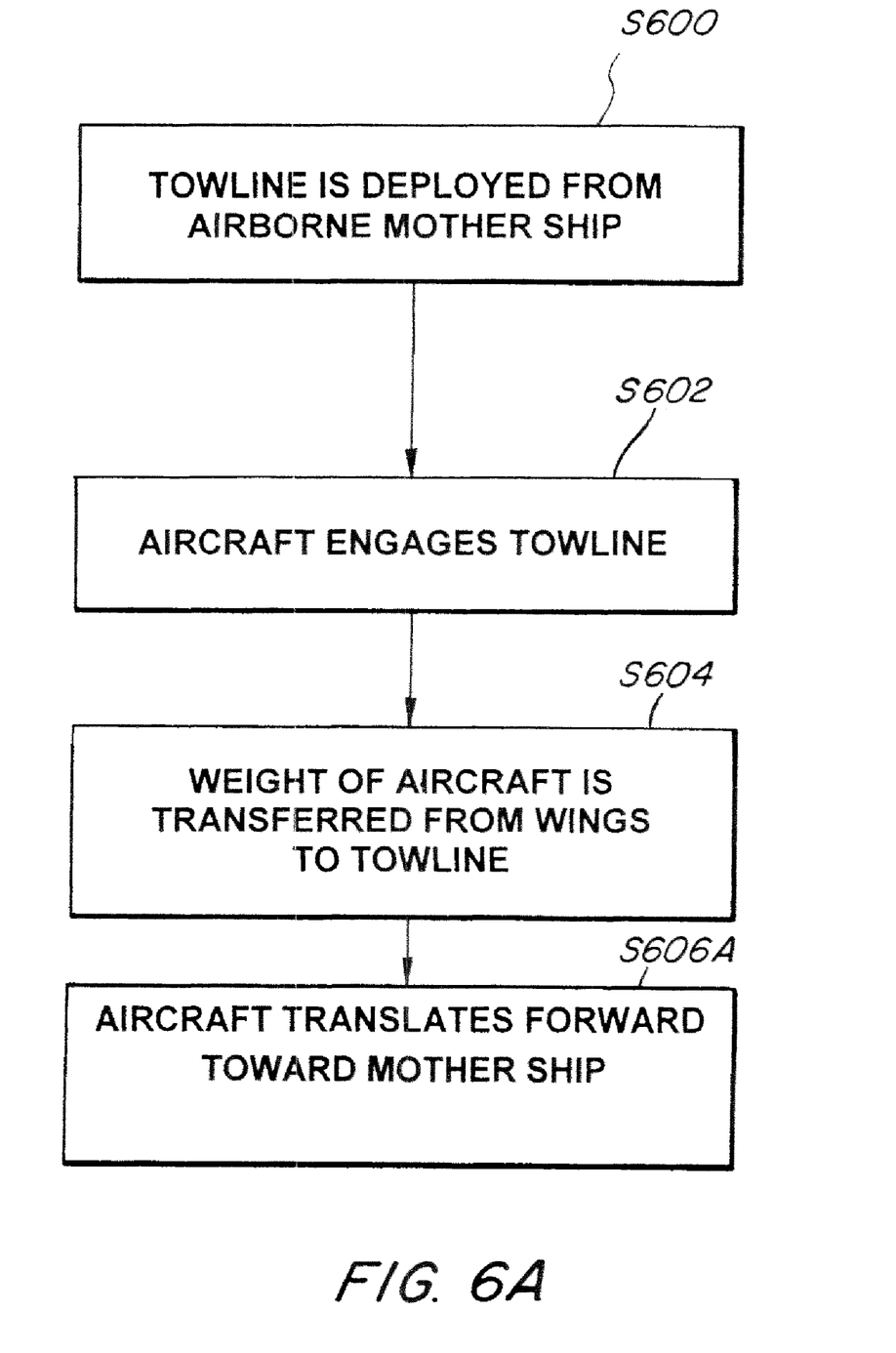
FIG. 6A is a flowchart illustrating another embodiment of the present methods for airborne recovery of aircraft.

With reference to FIG. 6, in one embodiment of the present methods for airborne recovery of the aircraft 12 the flexible tether 16 is deployed from the airborne mother ship 14 as described above and as shown at step S600. The aircraft 12 engages the flexible tether 16 at step S602 and the weight of the aircraft 12 is transferred from the wings 28 to the flexible tether 16 at step S604. The aircraft 12 is translated forward along the flexible tether 16 toward the mother ship 14 at step S606. Alternatively, in embodiments where the position of the aircraft 12 on the flexible tether 16 is fixed, the aircraft 12 is translated forward toward the mother ship 14 as the flexible tether 16 is reeled in, as shown at step S606A (FIG. 6A). In some embodiments the weight of the aircraft 12 may be transferred from the wings 28 to the flexible tether 16 before the aircraft 12 begins translating forward toward the mother ship 14. In other embodiments the weight of the aircraft 12 may be transferred from the wings 28 to the flexible tether 16 as the aircraft 12 translates forward toward the mother ship 14. In some embodiments the aircraft 12 may translate forward under its own power, and in other embodiments the aircraft 12 may translate forward under the influence of a shuttle 42 secured to the aircraft 12 and to the flexible tether 16.

Certain embodiments of the present methods for airborne recovery of the aircraft 12 may include additional steps. For example, prior to engaging the flexible tether 16 the aircraft 12 may locate the mother ship 14 and/or the flexible tether 16 using sensors and/or guidance apparatus such as those described above. Prior to or during the aircraft's translation forward toward the mother ship 14 the shuttle 42 (FIG. 1) may translate rearward along the flexible tether 16 to engage the aircraft 12. The shuttle 42 may be attached to the shuttle line 44 that can be reeled in to pull the aircraft 12 back into the mother ship 14. During or after the step of transferring the weight of the aircraft 12 from the wings 28 to the flexible tether 16 the aircraft's wings 28 may be folded or stowed. Once inside the mother ship 14, the aircraft 12 may be refueled, rearmed and/or serviced. These processes may be carried out by personnel aboard the mother ship 14 or by machines. When refueling, rearming and/or servicing are complete, the aircraft 12 may be re-launched. Prior to re-launch, a new pilot may board the aircraft 12. If the aircraft 12 is not to be re-launched, it may be powered down and stowed in the cargo hold 34 of the mother ship 14. After all aircraft 12 have been launched and/or recovered, the flexible tether 16 may be retracted into the mother ship 14. Before, after or during retraction of the flexible tether 16, the drag device 20 may be deflated or otherwise rendered ineffective. The mother ship 14 may then return to base with the recovered aircraft 12.

As the present description illustrates, embodiments of the present system 10 and methods for airborne launch and recovery of aircraft provide myriad advantages. The system 10 enables aircraft to be recovered and re-launched so that their missions can be extended indefinitely. Missions no longer need be limited in duration by the fuel capacity of the aircraft, exhaustion of weaponry, pilot fatigue or the need to perform aircraft maintenance. Aircraft may be recovered and launched smoothly without being significantly affected by turbulent airflow near the mother ship.

The above description presents the best mode contemplated for carrying out the present system and methods for airborne launch and recovery of aircraft, and of the manner and process of making and using them, in such frill, clear, concise, and exact terms as to enable any person skilled in the art to which they pertain to make this system and use these methods. This system and these methods are, however, susceptible to modifications and alternate constructions from those discussed above that are fully equivalent. Consequently, this system and these methods are not limited to the particular embodiments disclosed. On the contrary, this system and these methods cover all modifications and alternate constructions coming within the spirit and scope of the system and methods as generally expressed by the following claims, which particularly point out and distinctly claim the subject matter of the system and methods.

What is claimed is:

1. A system for airborne launch and recovery of an aircraft, comprising:
    an airborne mother ship;
    a flexible tether attached to the airborne mother ship and configured to be towed behind the airborne mother ship;
    a drag device secured to a distal end of the flexible tether, the drag device being configured to generate drag and maintain tension in the flexible tether;
    a reel attached to the airborne mother ship, the reel being configured to anchor a proximal portion of the flexible tether and to selectively let out and take up the flexible tether; and
    a capture mechanism connected to the aircraft, the capture mechanism being configured to engage the flexible tether to secure the aircraft to the flexible tether.

2. The system of claim 1, wherein the capture mechanism fixes a position of the aircraft along the flexible tether.

3. The system of claim 1, wherein the drag device includes apparatus that enables a magnitude of the drag generated by the device to be adjusted.

4. The system of claim 1, further comprising a sensor configured to detect a position of the flexible tether.

5. The system of claim 1, wherein the drag device comprises a ballute.

6. A method for airborne launch of an aircraft, the method comprising the steps of:
    deploying a flexible tether from an airborne mother ship;
    translating an aircraft, including wings, rearward away from the mother ship; and
    transferring the weight of the aircraft from the flexible tether to the wings.

7. The method of claim 6, wherein the step of translating the aircraft rearward away from the mother ship comprises letting out additional length of the flexible tether from the mother ship as a position of the aircraft upon the flexible tether remains fixed.

8. The method of claim 6, further comprising the steps of aborting the launch and recovering the aircraft.

9. The method of claim 6, further comprising the step of releasing the aircraft from the flexible tether.

10. The method of claim 6, wherein the step of deploying the flexible tether includes deploying a drag device secured to a distal end of the flexible tether.

11. The method of claim 6, further comprising the step of securing the aircraft to the flexible tether.

12. The method of claim 6, further comprising the step of arresting further translation of the aircraft prior to the step of releasing the aircraft from the flexible tether.

13. The method of claim 6, wherein the step of transferring the weight of the aircraft from the flexible tether to the wings comprises at least one of deploying the wings, unfolding the wings, collapsing spoilers on the wings, and morphing the wings.

14. The method of claim 6, further comprising the step of supporting the aircraft on a cradle.

15. A method for airborne recovery of an aircraft, the aircraft including wings, the method comprising the steps of:
    deploying a flexible tether from an airborne mother ship;
    the aircraft engaging the flexible tether;
    transferring the weight of the aircraft from the wings to the flexible tether; and
    translating the aircraft forward toward the mother ship.

16. The method of claim 15, wherein the step of translating the aircraft forward toward the mother ship comprises taking up length of the flexible tether into the mother ship as a position of the aircraft upon the flexible tether remains fixed.

17. The method of claim 15, wherein the step of deploying the flexible tether includes deploying a drag device secured to a distal end of the flexible tether.

18. The method of claim 15, further comprising the step of performing at least one of refueling the aircraft, rearming the aircraft and servicing the aircraft.

19. The method of claim 15, further comprising the step of re-launching the aircraft.

20. The method of claim 15, further comprising the step of locating the flexible tether.

21. The method of claim 20, wherein the step of locating the flexible tether comprises an optical sensor, light detection and ranging (LIDAR), or a differential global positioning system (GPS).

22. The method of claim 15, wherein the step of transferring the weight of the aircraft from the wings to the flexible tether comprises at least one of stowing the wings, folding the wings, spoiling the wings, and morphing the wings.

23. The method of claim 15, further comprising the step of supporting the aircraft on a cradle.

* * * * *